C. H. KELLOGG.
MACHINERY FOR ATTACHING BUTTONS TO CARDS.
No. 195,715. Patented Oct. 2, 1877.
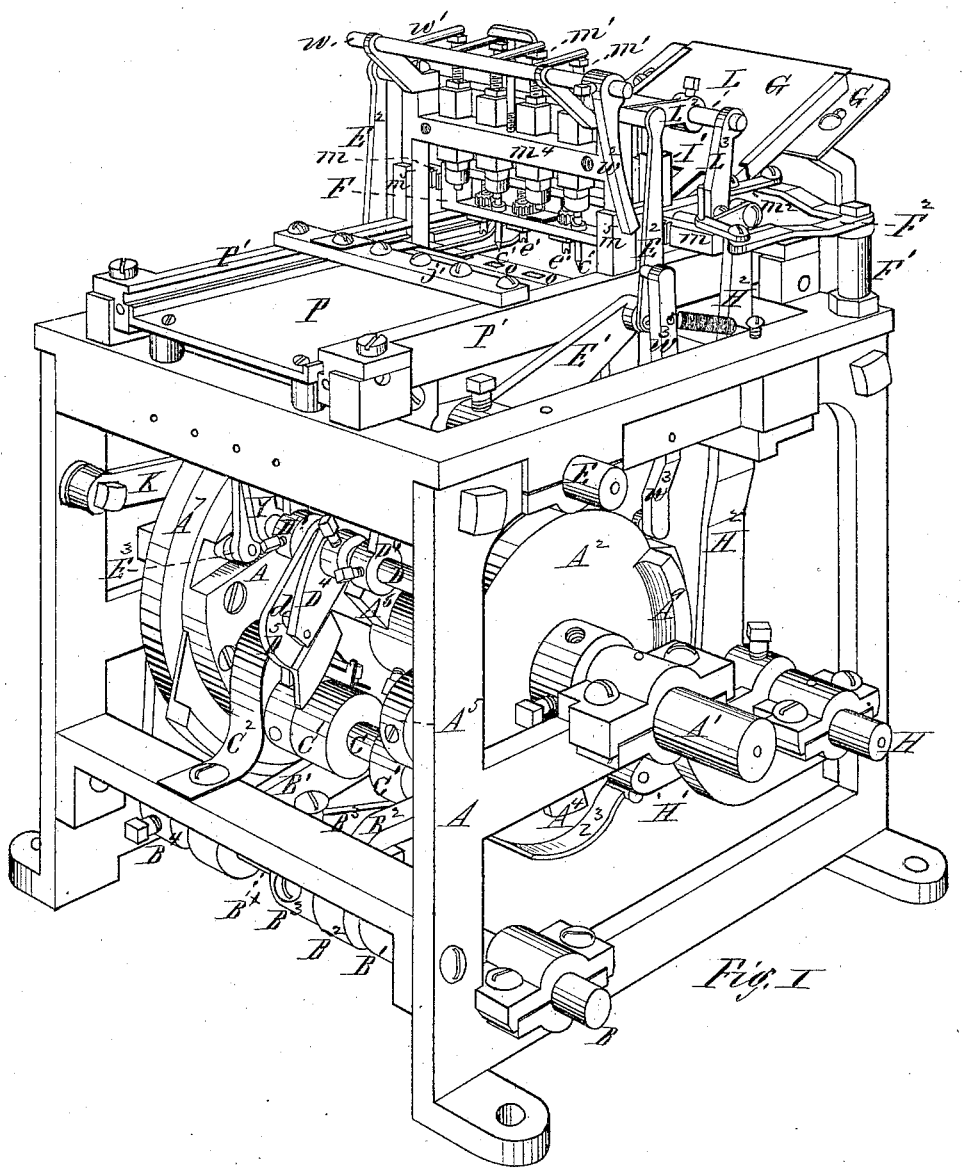
Fig. I.

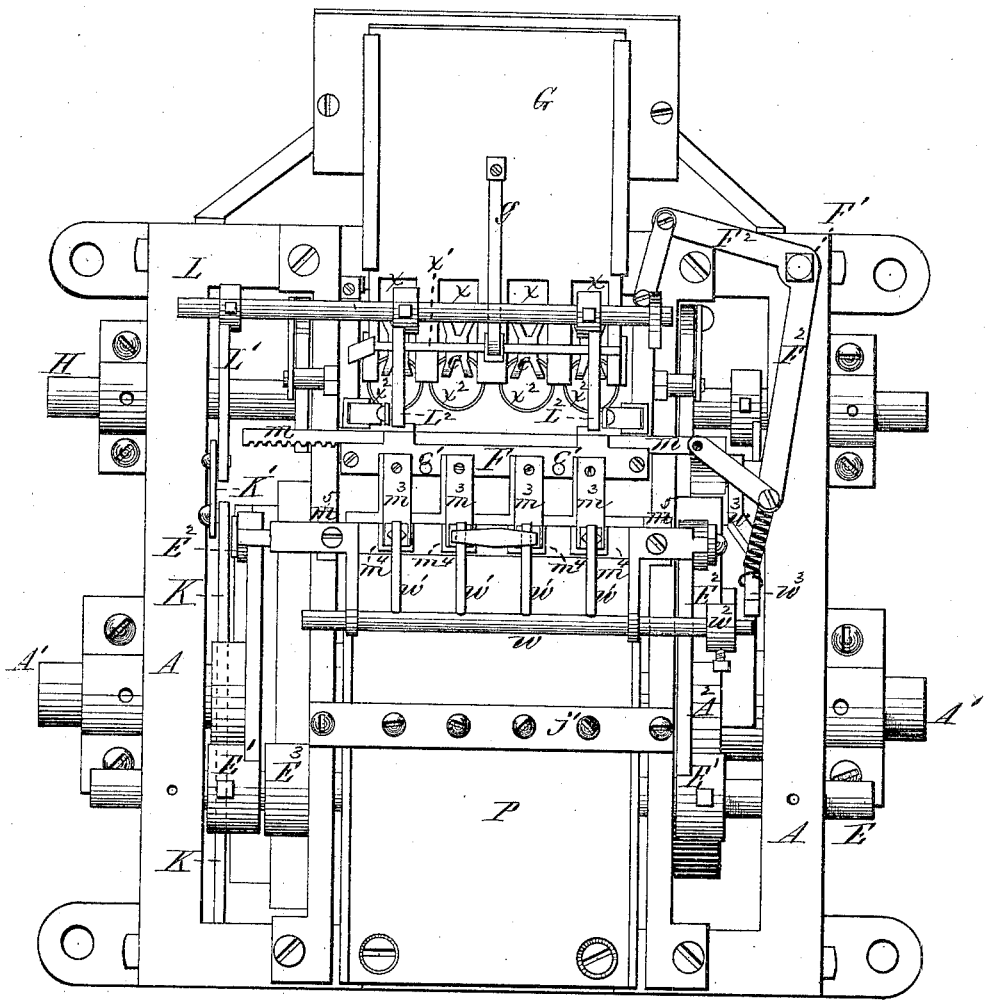
Fig. II

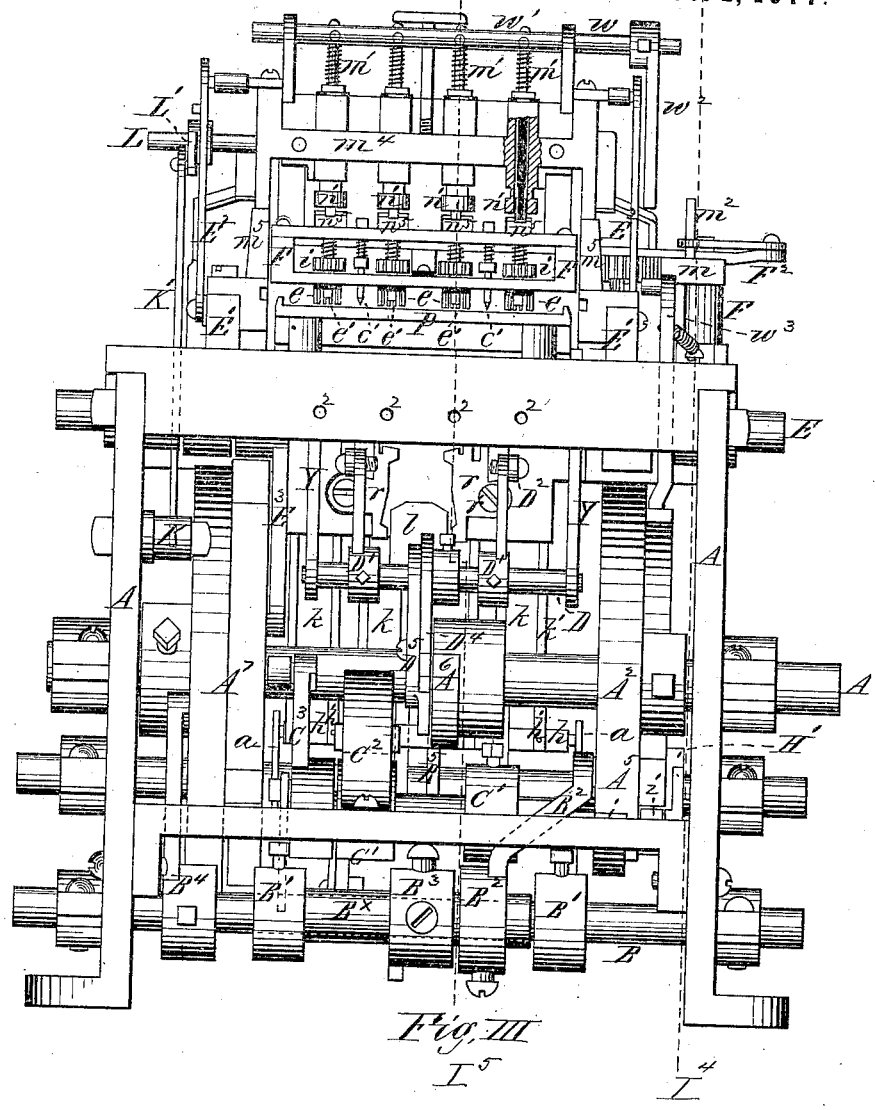

7 Sheets—Sheet 4.
C. H. KELLOGG.
MACHINERY FOR ATTACHING BUTTONS TO CARDS.
No. 195,715. Patented Oct. 2, 1877.
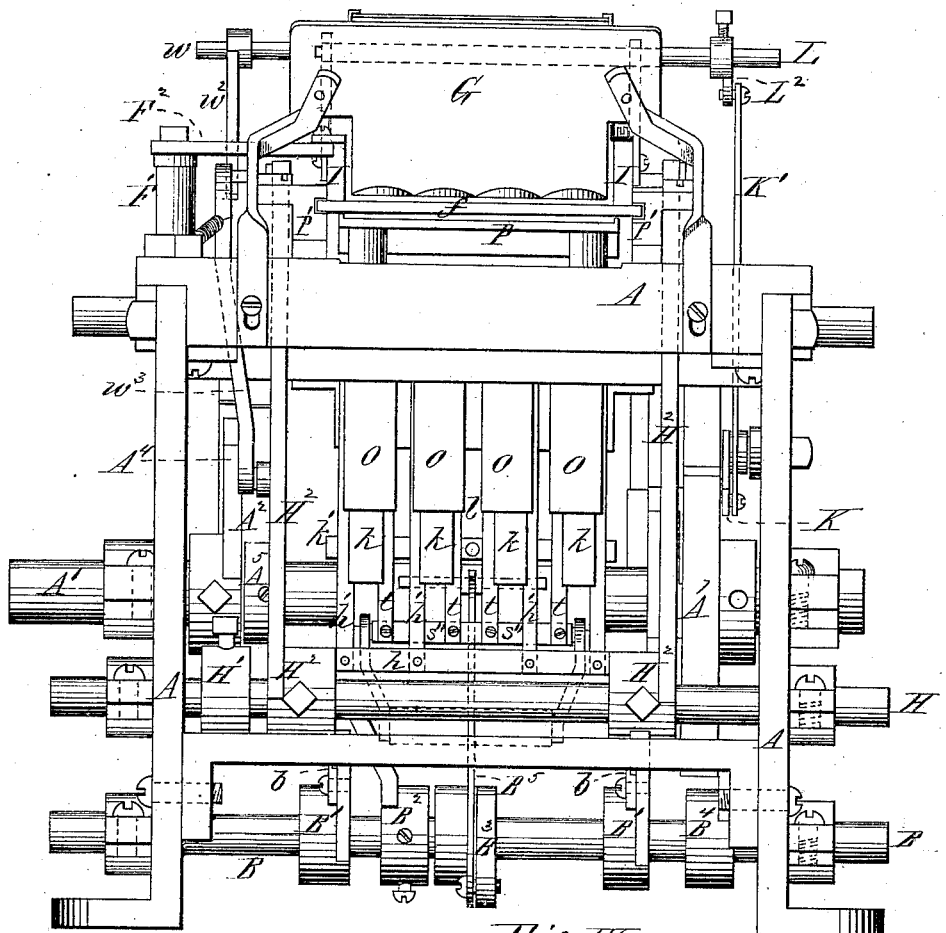
Fig. IV
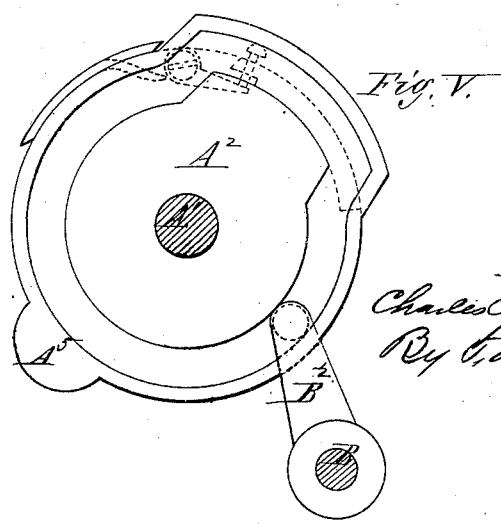
Fig. V
Witnesses
E. A. Slager
G. D. Chamberlain
Inventor
Charles H. Kellogg
By C. A. Custis
his Atty.

C. H. KELLOGG.
MACHINERY FOR ATTACHING BUTTONS TO CARDS.
No. 195,715. Patented Oct. 2, 1877.
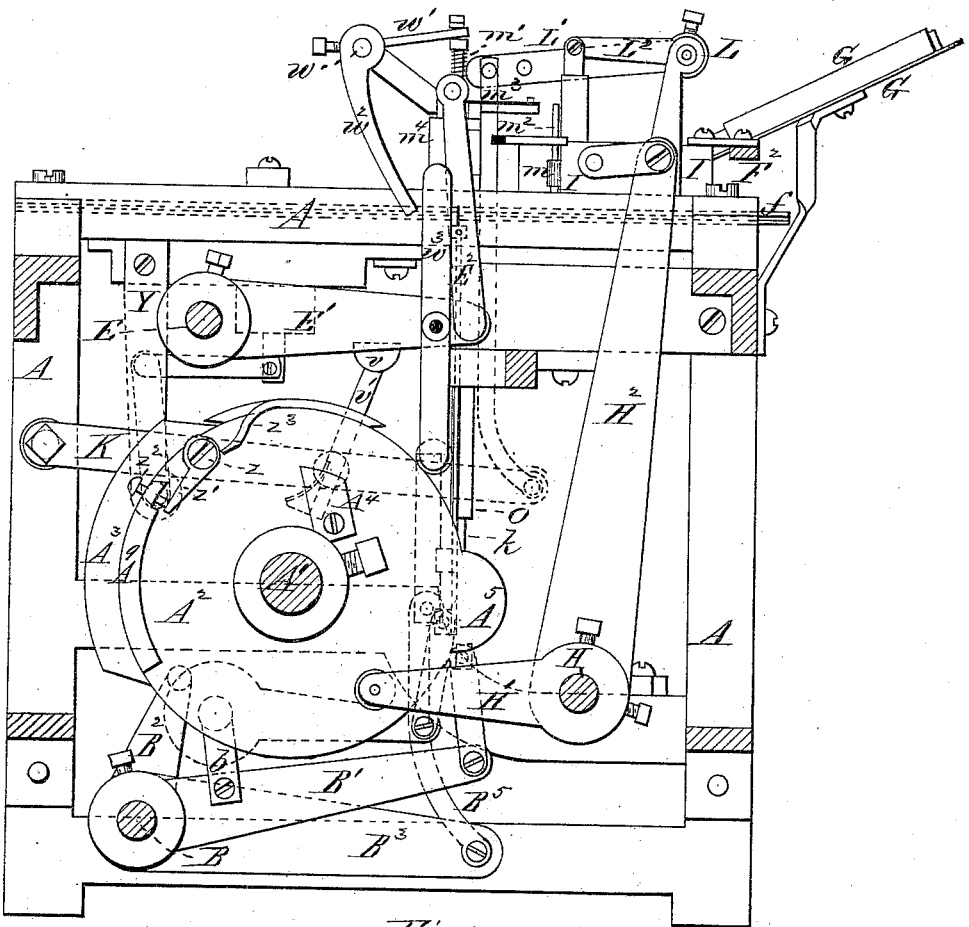
Fig. VI.
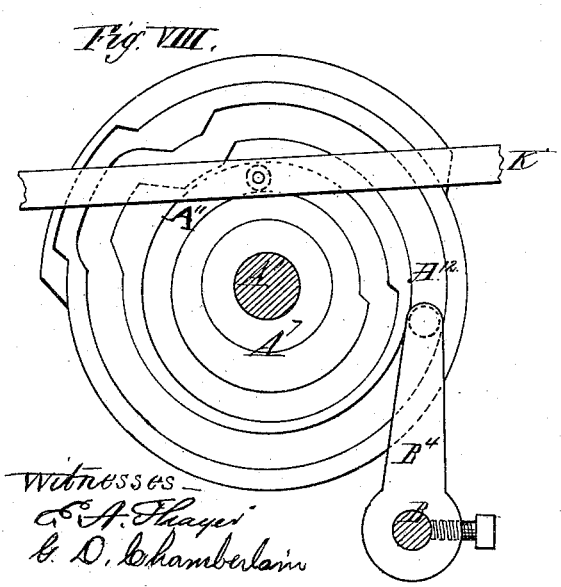
Fig. VIII.
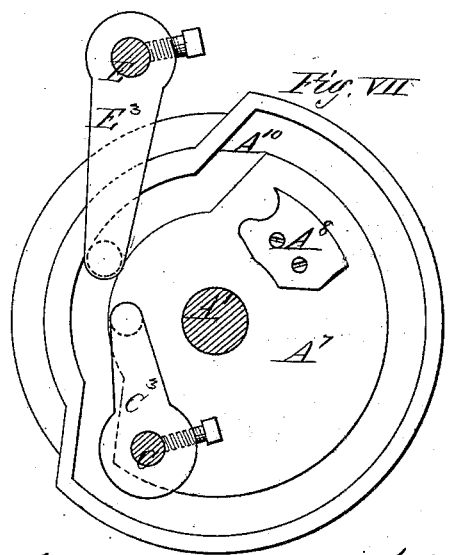
Fig. VII.
Witnesses
E. A. Thayer
G. D. Chamberlain
Charles H. Kellogg, Inventor,
By T. A. Curtis, his atty.

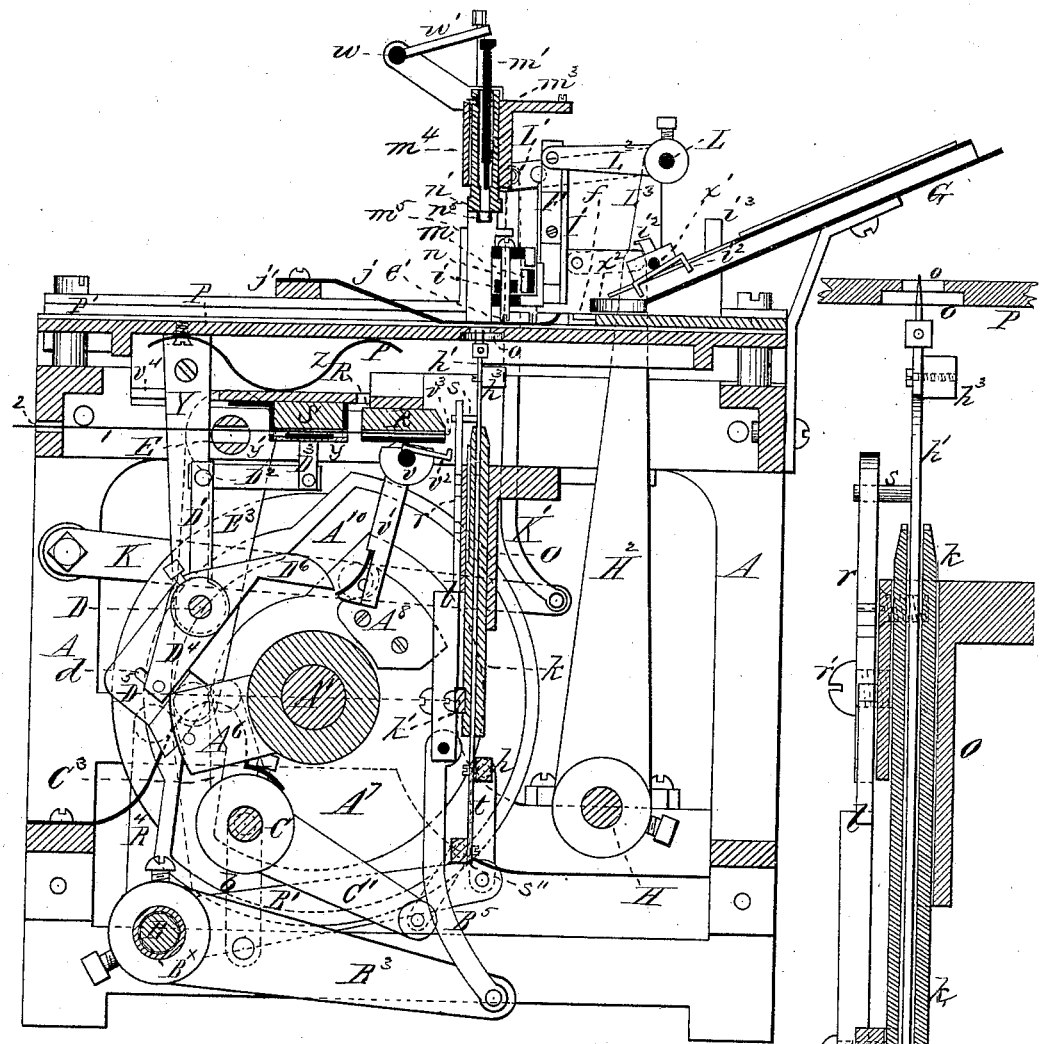

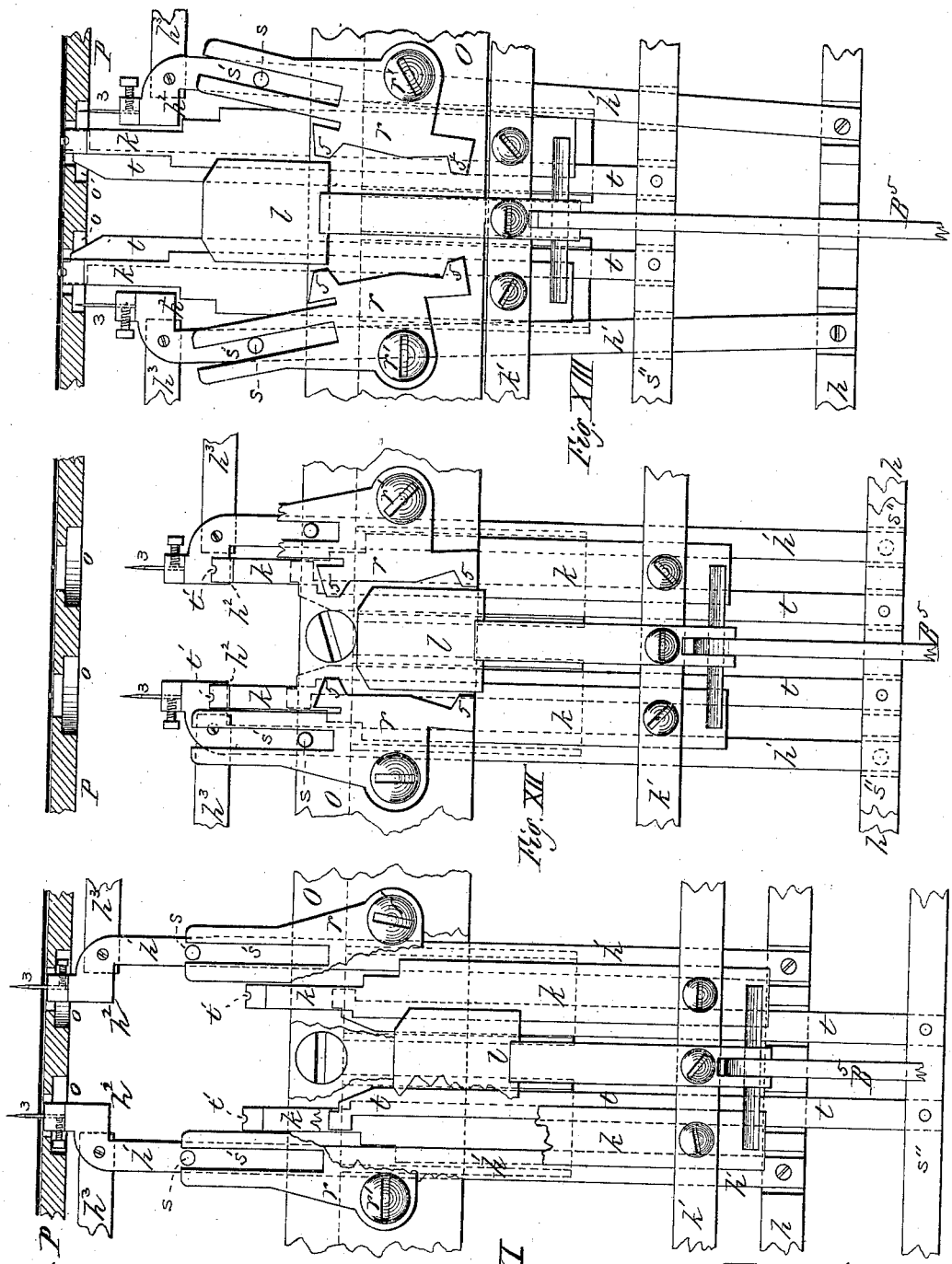

UNITED STATES PATENT OFFICE.

CHARLES H. KELLOGG, OF EAST LEVERETT, MASSACHUSETTS, ASSIGNOR OF ONE-HALF HIS RIGHT TO SAMUEL R. NEWELL AND NELSON C. NEWELL.

IMPROVEMENT IN MACHINERY FOR ATTACHING BUTTONS TO CARDS.

Specification forming part of Letters Patent No. 195,715, dated October 2, 1877; application filed May 19, 1877.

*To all whom it may concern:*

Be it known that I, CHARLES H. KELLOGG, of East Leverett, in the State of Massachusetts, have invented a new and useful Machine for Attaching Buttons to Cards or Paper; and that the following is a full, clear, and exact description thereof, reference being had to the accompanying drawings, making a part of this specification, and to the letters of reference marked thereon.

My invention consists of a machine having certain shafts provided with cams and levers, and arms, and with a slide, and certain spindles having a rotating movement, by means of which the buttons when placed in a receptacle, and a card or strip of paper placed on the platform, are both carried forward and placed in proper position to have the card perforated at the points where the holes through the buttons lie; and it also consists of certain needles and their bars, together with jaws and drivers, and also of a feed mechanism and cutters, whereby, after the card or paper has been perforated by said needles, small wire or similar material is fed into the machine, cut off into proper lengths, bent into the form of staples, the latter inserted through the perforations and also through the eyes of the buttons, and the ends of the staples properly clinched or bent down, so that the buttons are delivered from the machine securely attached to the cards, and ready for packing and shipment, all which will be more fully hereinafter described and set forth.

Figure I is a perspective view of my invention. Fig. II is a plan view of the same. Fig. III is a front view of the same. Fig. IV is a rear view. Fig. V is a detail view of the inside of the cam-plate $A^2$ and groove therein, with the lever operating therewith, which gives motion to the sleeve $B^\times$ and arms secured thereon. Fig. VI is a vertical section of the machine at line $I^4$, Fig. III. Fig. VII is a detail view of one side of the cam-plate $A^7$, showing the groove $A^{10}$ and the cam-projection $A^8$ thereon, which actuate the levers $E^3$ and $C^3$, respectively. Fig. VIII is a detail view of the reverse side of the plate $A^7$, showing the grooves $A^{11}$ and $A^{12}$ therein, which actuate the levers K and $B^4$, respectively. Fig. IX is a vertical section of the machine at line $I^5$, Fig. III. Fig. X is an enlarged vertical section through the jaws, showing the position of the needle-bars and needles which pierce the card, and the drivers which drive the staples up through the card and buttons. Fig. XI is a front view of the drivers, jaws, and needle-bars, showing the needles forced up, as in the operation of piercing the card, and with the cam and jaws partially broken away to show the drivers, which are located inside or between the jaws. Fig. XII is a front view of the same parts of the machine with the needle-bars drawn down, and the jaws and drivers moved up, as in the operation of forming the staple; and Fig. XIII is a front view of the same parts with the needle-bars moved to one side, and the jaws and drivers moved up, as in the operation of forcing the staple through the card and button, and securing it.

In the drawings, A represents the frame of the machine; P, the platform supported thereon, having at the sides the horizontal guides or ways $P'$ and the vertical guides or ways $m^5$. $A^1$ is the main cam-shaft, upon which are secured the cams which give motion to all the other parts of the mechanism. B, $B^\times$, C, D, and H are rock-shafts, having their bearings in the frame or in parts attached thereto, at suitable points, upon which shafts are secured the arms which are moved by contact with the cams to move the rock-shafts, and also the levers attached thereto and connected with the moving mechanism.

$f$ is a slide, moving to and fro in the horizontal ways or guides $P'$, at the rear end of machine, and upon which slide are two upright or vertical guides, I, one on each side, in which the carriage F moves up and down, the slide $f$ being moved forward horizontally by the piece $A^4$ upon the cam-plate $A^2$ coming in contact with the end of the arm $H^1$, rocking the shaft H, and moving the lever $H^2$ and slide $f$, to which it is attached, forward. The slide is moved back again by the piece $z^1$, pivoted at $z$ to the cam-plate $A^2$, said piece being made adjustable to cause the slide to be thrown back a greater or less distance by the screw $z^2$ passing through a flange, $A^9$, and against the piece $z^1$; and a small rock-shaft, L, is caused to rock by the arm K moving in a groove in the cam-plate $A^7$ and the arms K' and L' connected therewith.

A suitable number of circular guides, $x^2$, are attached to the forward end of the hopper or chute G, and a rock-shaft, $x^1$, is supported in suitable bearings, with stops or trips $l^2$ (corresponding in number and linear position with the guides $x^2$) attached to the shaft, and when the slide $f$ moves forward the projection $i^3$ on the slide strikes against a similar projection, $i^2$, on the shaft $x^1$, and rocks the latter and elevates the forward depressed end of the trip $i^4$, and permits a single button to drop into the circular guide $x^2$ and down upon the platform in front of the slide $f$.

The carriage F is provided with a suitable number of spindles, $e'$, each having two points at its lower end, which points are the same distance apart as the two thread-holes through a button, and these spindles are located directly forward of, and in a line with, the circular guides $x^2$, and to each spindle is secured a small toothed wheel, $i$, the teeth of which engage with the teeth of a rack, $m$, which is arranged to slide to and fro in the carriage F, and operates to rotate the wheels $i$ and spindles $e'$, to which they are attached. The spindles are held down by springs arranged thereon, but they may be forced upward slightly, if necessary.

The rack $m$ is caused to move to and fro by a bell-crank, $F^2$, pivoted to the frame at $F^1$, one arm of which is loosely attached to a vertical pin on the rack, and the other arm attached to the slide $f$, so that when the latter is moved forward the rack is moved in one direction, and when the slide is moved backward the rack is moved in the opposite direction, causing the small wheels $i$ and the spindles $e'$ to make a reciprocating rotary movement as they move forward and backward.

When the slide $f$ is moved forward the carriage F is dropped by the movement of the arm K against its cam, causing the sharp pins $c'$ fixed in the carriage F to slide forward upon the platform. The pins have a spring attached to each, to allow them to be forced upward a little, and when the slide moves back the carriage is raised by the action of the cam and arm K.

$m^4$ is a frame sliding up and down freely in the vertical ways $m^5$, which movement is caused by the lever $E^3$ operating in the groove $A^{10}$ in the cam-plate $A^7$, which rocks the shaft E and moves the arms $E^1$ and $E^2$, which are connected on each side of the machine to the frame $m^4$.

This frame is provided with a series of hollow guides, $n^1$, capable of a slight vertical movement in the frame, and held down by springs $m^3$ attached to the upper part of the frame, or secured in any convenient manner, the lower end of the guides terminating in a short tube, $n^5$, of about the same size as the spindles $e^1$, so as to enter freely the large hole in one side of the button, and hold the latter firmly in place while the needles are perforating the card; and these guides $n^1$ and tube at the lower ends are hollow, with a plunger, $m^1$, operating inside.

These plungers are held up by springs placed around their upper ends, or by any other convenient means, and are forced down by arms $w^1$ attached to a rock-shaft, $w$, motion being given to the latter by the cam $A^5$ throwing the upper end of the arm $w^3$ against the arm $w^2$ attached to the rock-shaft $w$, as shown in Fig. IX.

The jaws $k$ consist of two upright bars, their lower ends secured to the horizontal piece $k'$, and extending up through the guides O secured to the frame of the machine, with the upright needle-bars $h^1$ between them at one edge, and the drivers $t$ between them at the other edge.

The needle-bars $h^1$ are all attached to one horizontal bar, $h$, at their lower ends, and stand in a vertical position beneath the platform P, the needles (two in the upper end of each bar) being directly beneath the holes $o$ in the platform, and the needle-bars are held in their proper vertical position between the two sides of the jaws $k$ at one edge, and their upper ends extend inward, and have a shoulder, $h^2$, as shown in Figs. XI, XII, and XIII, and each bar is provided with a projection or pin, $s$, near its upper end.

The drivers $t$ consist of a series of upright bars, secured at their lower ends to the horizontal bar $s''$, and extending up between the jaws $k$ at one edge, their upper ends extending inward, so that their extreme upper ends will be between the jaws and directly beneath the small recess $t'$ in the extreme upper ends of the jaws, as shown clearly in Fig. XI. Two cams or pieces, $r$, are pivoted at $r'$ to the piece O' secured on the front side of the guides O, said pieces having on their inside upper edges the projections 5, and also similar projections in a corresponding position at their lower ends, and these pieces $r$ are elongated at their upper ends, in which elongated part of each is a slot, $s'$, in which the pins $s$ move up and down. The piece $l$ is attached to the bar $k'$, and as it moves up between the cams $r$ it strikes against the upper projections 5 of the cams, and throws the pins $s$ and upper ends of the needle-bars apart or outward, as shown clearly in Fig. XIII, and as the piece $l$ moves down again it strikes against the lower projections 5, throwing the upper slotted parts of the pieces $r$, and the pins $s$, and needle-bars $h^1$ inward, as shown clearly in Figs. XI and XII.

In the arrangement of the parts above described the hole $o$ in the platform P, the tubular projection $n^5$ on the lower ends of each of the guides $n^1$, the rotating spindles $e'$, and the circular guides $x^2$ are all in a direct line with each other in a direction lengthwise of the machine, and any desired number of each may be used side by side to operate upon any desired number of buttons at once, and each needle, driver, and set of jaws is located directly beneath a corresponding hole, $o$, and tubular projection $n^5$, and in line or in the same vertical plane with the corresponding before-mentioned parts of the machine above the platform, so that the desired number of buttons may be attached to a card at each revolution of the shaft $A^1$.

A spring, $j$, is attached to a cross-bar, $j'$, or other convenient point on the machine, which spring extends rearward, close to the platform, and beneath each guide $n^1$ to a point just in front of the circular guide $x^2$, a spring to each hole $o$, so that when the slide $f$ moves forward it pushes a button forward under each spring into a position, so that when the carriage F moves back and drops, the lower end of each spindle $e'$ enters the large hole in the button, and (the spring being made forked for that purpose) carries the button forward along the platform and beneath the spring when the carriage F is moved forward.

The needle-bars $h^1$ may be connected together at their upper ends by a horizontal bar, $h^3$—that is to say, if the buttons are to be attached to the cards in a series of four in each row, only one piece, $l$, will be required, with two needle-bars, $h^1$, each side, which two may be connected together by a bar, $h^3$, so that the lateral or side movement of the first needle-bar each side of the piece $l$ will be communicated to the second one on the same side by the said bar $h^3$, and the four needle-bars be operated with only two cams, $r$, and one piece, $l$, between.

The needle-bars $h^1$ are moved upward and downward by the lever $B^4$ attached to the shaft B, and moving in its groove in the cam-plate $A^7$, and the two arms $B^1$ secured to said shaft, and connected with the horizontal bar $h$, to which the lower ends of the needle-bars $h^1$ are attached.

The shaft C has its bearings in pieces $b$ secured to the arms $B^1$, and secured to said shaft are the arms $C^1$ and the lever $C^3$, the latter operating against the cam $A^8$ on the cam-plate $A^7$ as said plate revolves, to give a rocking motion to the shaft C. The arms $C^1$ are connected with the horizontal bar $s''$, attached to the lower ends of the drivers $t$ to move the latter up and down.

The jaws $k$, attached at their lower ends to the bar $k'$, are moved up and down by the arm $B^3$, connected with said bar by the piece $B^5$, said arm being secured to the sleeve $B^\times$ placed loosely upon the shaft B, and a rocking motion is given to the sleeve $B^\times$ by the lever $B^2$, secured to the sleeve and operating in a groove in the cam-plate $A^2$.

Supported in bearings Y, secured to the frame, is a shaft, D, to which is fixed an arm, $D^4$, with a slotted piece, $D^5$, attached thereto, so that said piece is adjustable upon the arm, to give the shaft the desired degree of rocking movement, either more or less, as is desired.

The opposite end of the arm $D^4$ terminates in the arm $D^6$, and is upon the opposite side of the shaft D, and also secured to the shaft D on the arms $D^1$, which are connected by the arms $D^2$ to the projection $D^3$ on the lower side of the plate $y$. This plate is hinged to the piece S at any convenient point, as at the front edge at $y'$, but in such manner that the plate will only open down from the piece S but a short distance; and the plate is provided with a flat disk, or piece of rubber, cork, or similar substance, secured thereto at points directly in line with the holes 2 2 in the front end of the machine.

When the shaft D is rocked in one direction, by the lever or cam $A^6$ on the shaft $A^1$ striking against the arm $D^4$ or its piece $D^5$, the arms $D^1$ and $D^2$ press the plate $y$ backward and close it up firmly against the sliding piece S, and then forces that backward in the grooves $v^4$. When the shaft D is rocked in the opposite direction, the arms $D^1$ and $D^2$ operate to draw the plate $y$ down, and to draw both the plate and the piece S forward in the grooves $v^4$.

The piece R, secured to the frame or to the lower side of the platform, has a series of horizontal holes, $v^3$, therein, in line with the holes 2 2, or nearly so, and also in line with the recesses $t'$ in the tops of the jaws $k$; and beneath this piece R is a small shaft, $v$, upon which, beneath the holes $v^3$, are secured the cutters $v^2$, the sharp cutting-points of which are moved up past the rear end of the holes $v^3$ by the lever or cam $A^6$, as it rotates, striking back the arm $v^1$ attached to the shaft $v$, the latter being forced back again by a spring attached thereto.

A spring, Z, may be placed between the platform P and the sliding plate S to give the latter the necessary friction.

The hopper or chute G is divided vertically at the lower end into the same number of compartments as there are holes $o$ in the platform, or series of needles and accompanying mechanism for attaching the buttons to the card.

The operation of my invention is as follows: The paper card to which the buttons are to be attached is inserted at the rear end of the machine, between the platform P and the slide $f$, and far enough forward that the sharp points $c'$ may rest upon the card, and any number of buttons (which should have the ordinary large hole or recess on one side, and two smaller thread-holes extending from the bottom of that through to the other side, as the ordinary vegetable-ivory buttons are made,) are placed in the chute G with the side having the large hole or recess uppermost, when they will slide down toward and into the lower end of the chute, the foremost one passing in between the forks of the trip $i^2$. Power then being applied to the shaft $A^1$ to give the latter a rotary motion, the arm $H^2$ will move the carriage F and slide $f$ forward, the series of trips $i^2$ being tilted by the projection $i^3$, permitting one button to drop down into each of the guides $x^2$ upon the platform P as the slide is moved back again. The next movement of the slide $f$ pushes this button or series of buttons, which have dropped upon the platform, forward along the latter, to a point so that as the carriage F is slightly raised it passes back to a point above the button or line of buttons, and the lever K and arms K' and L' cause the carriage to drop, bringing the sharp points $c'$ and the wires $e$ down, the former upon the card and the latter behind the buttons upon the platform.

As the slide and carriage are again moved forward by the lever H and arm $H^2$ the points $c'$ move the card forward, and the buttons are also moved forward by the spindles $e'$, their lower ends having dropped into the large hole or recess in each button. If the two small thread-holes in each button and the two points on each spindle $e'$ happen to correspond in position, the two points drop into the thread-holes; but if they do not correspond the spindle rises slightly, owing to the elasticity of its spring, and as the carriage F moves forward the rack $m$, by the pivoted arm $F^2$ and the toothed wheels $i$ on the spindles engaging with the teeth of the rack, the wheels and spindles are caused to revolve, and when the spindles turn so that the points on their lower ends and the holes in the buttons do correspond, the points drop into the holes.

The buttons and card are both carried forward to a point so that the holes in the buttons are directly over the holes $o$ in the platform, and also over the needles. The carriage F then moving back, the frame $m^4$ is then moved down by the lever $E^3$ and arms $E^1$ and $E^2$, the tubular projections or ends $n^5$ on the lower ends of the hollow plungers $n^1$ entering the large holes or recesses of the buttons, and holding the latter firmly in place. The needles $h^1$ are then moved up by the lever $B^4$ and arms $B^1$, and pierce the card immediately beneath the two holes in each button, the position of the needles being shown in Fig. XI.

While the carriage F and slide $f$ are being moved forward to bring the buttons over the holes $o$ in the platform P, the small wire shown at 1, which has been inserted in the holes 2 in the front of the machine and between the plate $y$ and piece S, and also through the piece R, as shown clearly in Fig. IX, is moved forward the proper distance by the rock-shaft and arms $D^1$ and $D^2$, actuated by the cam $A^6$ and arm $D^5$, the plate $y$ being pressed up firmly against the piece S and grasping the wire firmly by the force exerted to move the plate back toward the needles. The needles are then drawn downward so that their shoulders $h^2$ are nearly on the same horizontal plane with the wire, and the jaws $k$ are then moved up by the lever $B^3$, which is secured to the sleeve $B^\times$ on the shaft B, until the wire is caught in the recesses $t'$ in the top of the jaws and pressed up a little against the shoulder $h^2$ of the needle-bar.

While that part of the wire which projects beyond the rear edge of the piece R is thus held between the top of the jaws $k$ and the shoulder $h^2$, the small shaft $v$ is rocked by the cam $A^6$ striking against the arm $v^1$, and the cutters $v^2$ are moved up and cut off these projecting pieces of wire, and the jaws $k$ are then carried up past the shoulder $h^2$, (the latter being between the jaws,) as shown in Fig. XII, and each piece of wire thus cut off is thereby bent into the form of a staple. The jaws and needle-bars then continue their upward movement, the piece $l$, also attached to the bar $k'$, being between the two lower projections 5 on the pivoted pieces $r$, and holding the needle-bars $h^1$ in a vertical position by the slot $s'$ and the pin $s$ on each needle-bar; but as the piece $l$ continues to move up it strikes against the upper projections 5 on the said pivoted pieces $r$, and forces their upper slotted ends apart, and carrying the needle-bars and the shoulders $h^2$ thereon outward and away from the jaws, as shown in Fig. XIII. The jaws then pass up, carrying the ends of the staple up to the holes made in the card by the needles, and the drivers $t$ are then carried up by the arm $C^1$ attached to the shaft C, which is moved by the lever $C^3$ and cam $A^8$ on the plate $A^7$, the drivers passing up between the jaws and driving the staple up through the holes in the card, and also through the holes in the button; and when the drivers are in this position, the ends of the staples projecting above the button and up into the tubular projection on the lower ends of the hollow pieces $n^1$, the plungers $m^1$ are forced down by the arms $w^1$, and the ends of the staples bent over or clinched, thus securing each button to the card.

After the series of buttons are secured the jaws $k$ and piece $l$ descend, and as the piece $l$ strikes against the lower projections 5 on the pieces $r$ the upper slotted ends of said pieces are moved inward, carrying the upper ends of the needle-bars $h^1$ back into a vertical position, and the jaws, drivers, and needle-bars all descend to their original position.

Another series of buttons are then moved forward, and the card moved forward also, at the next forward movement of the carriage F, and the same operations are repeated until the required number of buttons are secured; or, the card may be a long strip, and, after the buttons are secured, the strip cut off, leaving the desired number of buttons upon each piece.

When the plate $y$ and its piece S, which feeds the wire to the cutters, are moved toward the needles, the wire is grasped between the plate $y$, or between the rubber secured thereon, and the piece S, and is moved back toward the cutters; but when the plate is moved forward again toward the front of the machine, or away from the cutters, the plate is tilted down on its hinge, and, the pressure being removed from the wire, it remains stationary until the plate grasps it again.

Any desired number of needle-bars, drivers, and jaws beneath the platform may be used, and a corresponding arrangement of mechanism above the platform, so that any desired number of buttons may be secured to the card at each revolution of the shaft $A^1$, and all the needle-bars $h^1$ on either side of the vertically-moving piece $l$ may be connected by a horizontal bar, $h^3$, so that when the first needle-bar on each side of said piece $l$ is thrown outward by the slot $s'$ and pin $s$, or thrown inward again by the downward movement of said piece $l$, the movement of the first needle-bar $h^1$ on each side of said piece shall be communicated to all the other needle-bars on the same side.

Whenever buttons which are not provided with the large recess in one side are to be attached to cards, of course the lower ends of the spindles $e'$ cannot enter the button, except the two points on their lower ends, which enter the eyes, when the position of the two correspond; and in that case the two pins $e$, which are secured to the carriage F a little distance each side of each spindle $e'$, and a little behind them, operate to carry the buttons forward, and hold them in position while being attached to the cards.

When the carriage F moves back and drops, these pins (two to each button) drop down behind the buttons, and carry them forward between them, while each spindle also rotates upon the button until the two points find the eyes of the button, and then drop in. These pins may be made adjustable forward and back, to suit buttons of different sizes.

Having thus described my invention, what I claim as new is—

1. In a machine for securing buttons to cards or paper, the combination of the chute G, the series of trips $i^2$, the slide $f$, and the levers $H^2$, as a means of delivering the buttons, one by one in each series, in position upon the platform adapted to be moved up by the carriage F to be secured to the card or paper, substantially as described.

2. The combination of the carriage F, the spindles $e'$, and the points $c'$, said carriage having both a vertical and a horizontal movement, as a means of carrying the buttons and card forward upon the platform into position where they are secured together, substantially as set forth.

3. The combination of the carriage F, the rotating spindles $e'$, each provided with a toothed wheel, $i$, and with two points upon the extreme lower end of each spindle, the rack $m$, and the pivoted arm $F^2$, as a means of carrying the buttons forward and placing them in a position with their eye-holes directly over the needle-points, in position to be secured to the card, substantially as described.

4. The combination of the needle-bars $h^1$, provided with the shoulders $h^2$, and needle-points on their upper end, and the jaws $k$, whereby the holes are pierced in the card, and the staples are formed ready to be inserted through the said holes and buttons, substantially as set forth.

5. The combination of the piece $l$, the slotted pivoted pieces $r$, the needle-bars $h^1$, provided with the shoulders $h^2$ and projections $s$, the jaws $k$, and the drivers $t$, whereby the staples are formed, moved up to position, and driven through the card and buttons to be clinched, substantially as described.

6. The combination of the jaws $k$, the drivers $t$, the tubular guides $n^1$, and the plungers $m^1$, as a means of holding the staples in place and clinching them to secure the buttons to the card, substantially as set forth.

7. The combination of the sliding piece S, the plate $y$ hinged thereto, the piece R, acting as a stationary knife, and the vibrating cutters $v^2$, as a means of feeding the wire and cutting it into proper lengths to be formed into staples, substantially as and for the purpose set forth.

8. The combination of the plate $A^2$, the piece $z^1$, pivoted thereto, and the set-screw $z^2$, turned through a flange on said plate, all forming an adjustable cam to regulate the backward movement of the slide $f$, substantially as set forth.

CHARLES H. KELLOGG.

Witnesses:
T. A. CURTIS,
E. A. THAYER.